United States Patent Office 3,411,943
Patented Nov. 19, 1968

3,411,943
PROCESS FOR THE IMPROVEMENT OF BOND STRENGTHS BETWEEN BRICK OR METALLIC SURFACES AND CEMENTITIOUS MATERIALS
Wallace J. Bragg, Houghton Lake, and Dallas G. Grenley, Midland, Mich., assignors to The Dow Chemical Company, Midland, Mich., a corporation of Delaware
No Drawing. Filed Dec. 2, 1965, Ser. No. 511,256
4 Claims. (Cl. 117—70)

This invention relates to a process for promoting the adhesion of a hardenable cementitious material to a brick or metallic surface. More particularly, it relates to the use of coatings of a latex of certain film-forming vinylidene chloride interpolymers as adhesion-promoting materials for securing mortars comprising hydraulic cement or the like to a brick or metallic surface.

In the application of mortars such as portland cement to bricks, as in the building of brick walls, or to metallic substrates such as metal pipes or metal reinforcement for hardenable cementitious materials, difficulty is experienced in obtaining an adequate and permanent union between the contacting surfaces of the dissimilar materials. This is due at least in part to the fact that the mortar in setting, tends to shrink whereas the brick or metallic surface with which it comes in contact does not undergo a corresponding shrinkage. Also, the differences between the coefficients of thermal expansion between the two types of materials often provides a severe shearing stress which results in failure of the bond between the materials.

In accordance with the present invention, the adhesion of portland cement mortar compositions to brick or metal surfaces is enhanced by a process comprising the sequential steps of (1) applying to the brick or metal surfaces an essentially continuous coating of a thermoplastic, vinylidene chloride interpolymeric latex consisting essentially of from about 35 to about 90 percent by weight of polymerized vinylidene chloride and from about 65 to about 10 percent by weight of at least one dissimilar interpolymerizable comonomer, as based on a total interpolymer latex solids content of 100 percent by weight, (2) allowing the coating to dry to a film, (3) applying the cementitious material to the coated brick or metal surface and (4) allowing the cementitious material to harden.

By the term "latex" is meant, an aqueous colloidal dispersion of the defined interpolymeric thermoplastic, resinous materials which may be manufactured by the emulsion polymerization of such interpolymerizable materials or by the aqueous dispersion of finely divided particles of such interpolymers. Such latexes may contain known dispersants and emulsifiers.

Exemplary of materials which may be interpolymerized with the required amounts of vinylidene chloride monomer are those materials having the general formula:

$$CH_2=C-X$$
$$\quad\ \ |$$
$$\quad\ \ R$$

wherein R is selected from the group consisting of hydrogen and the methyl group and X is selected from the group consisting of —CN, halogens of atomic numbers 9 to 35, and ester-forming groups —COOY, wherein y is selected from the group consisting of a primary alkyl group and a secondary alkyl group, each of the foregoing alkyl groups containing from 1 to 18 carbon atoms inclusively.

Illustrative of the secondary or dissimilar interpolymerizable monomeric materials applicable in the preparation of suitable interpolymer latexes can be methylacrylate, ethyl acrylate, propyl acrylate, isopropyl acrylate, butyl acrylate, isobutyl acrylate, sec.-butyl acrylate, tert.-butyl acrylate, amyl acrylate, isoamyl acrylate, tert.-amyl acrylate, hexyl acrylate, 2-ethyl-hexyl acrylate, cyclohexyl acrylate, octyl acrylate, 3,5,5-trimethylhexyl acrylate, decyl acrylate, dodecyl acrylate, cetyl acrylate, octadecenyl acrylate, methyl methacrylate, ethyl methacrylate, propyl methacrylate, butyl methacrylate, n-amyl methacrylate, sec.-amyl methacrylate, 2-ethylbutyl methacrylate, octyl methacrylate, phenyl methacrylate, cyclohexyl methacrylate, 3,5,5-trimethylhexyl methacrylate, decyl methacrylate, dodecyl methacrylate, and octadecyl methacrylate and butyoxyethyl acrylate or methacrylate or other alkoxyethyl acrylates or methacrylates, vinyl halides (e.g. vinyl chloride, vinyl bromide, etc.), acrylonitrile, methacrylonitrile, and the like.

Representative types of vinylidene chloride-containing interpolymer latexes which have been discovered to be highly satisfactory as the latex components employed in the present invention include the following interpolymer latexes designated and differentiated in the following Chart A by the approximate percentage weight compositions of the organic interpolymerizable monomeric components contained in each individual latex.

CHART A.—VINYLIDENE CHLORIDE-CONTAINING INTERPOLYMER LATEX COMPOSITIONS

| Organic Monomer Components | Percent by Weight | | | | | | | | | | | |
|---|---|---|---|---|---|---|---|---|---|---|---|---|
| Vinylidene chloride | 40 | 60 | 89 | 90 | 50 | 88 | 50 | 52 | 70 | 75 | 75 | 75 |
| Vinyl chloride |   |   |   |   |   |   | 40 | 35 | 20 | 20 | 20 | 20 |
| Ethyl acrylate |   | 60 | 40 |   |   | 40 | 7 | 10 |    | 10 | 5 |    | 3 |
| Methyl methacrylate |   |   |   | 10 | 10 |   |   |   |   |   |   | 2 |
| 2-ethylhexyl acrylate |   |   |   |   |   |   |   |   | 13 |   |   |   |
| Acrylonitrile |   |   |   | 11 |   | 5 |   |   |   |   | 5 |   |

The amounts of latexes to employ can vary widely but should be sufficient to give at least a nearly continuous coating of the film-forming polymer on the brick or metal substrate being coated. The quantities, in any event, are about those normally employed in the prior art for forming films of the same polymer. When the latex is applied to the substrate by suitable means, such as brushing or spraying, the substrate may receive a monomolecular film layer or more depending upon the viscosity and the solids content of the dispersion. Thus, the amount of polymer present may be so great as to give quite a thick coating of the polymer, or so small as to give something approximating a monomolecular coating. In any event, the amount to be used can be gauged entirely by the results desired, as is the case in the application of paint and polymer films generally in the prior art. After coating the brick or metal substratum the latex coating is allowed to dry prior to application of the mortar.

The term "portland cement" is used herein to include generally the kind of product obtained by heating lime-clay mixtures, or natural cement-rock, to such a temperature that practically the entire product is sintered, followed by grinding. The product is often a mixture of dicalcium and tricalcium silicate with lesser amounts of aluminate. Various additives can be included in accordance with conventional portland cement manufacturing practices. It will be understood that various modifications such as the hydraulic cements of the kind commonly known as calcium-aluminate cements can be used as substantial equivalents for the purposes of this invention.

In applying the mortar to the latex coated brick or metal, the mixture of portland cement is incorporated with water in the well known manner and is spread upon the surface to be coated while in an easily workable condition. After the cement has set, it will be found that it is securely bonded to such surface.

The following examples, wherein all parts and percentages are to be taken by weight, serve to illustrate the present invention but are not to be construed as limiting its scope.

Example 1

In each of a series of experiments individual one-inch square pieces of various non-coated metals were dipped into a polymeric latex composed of an aqueous emulsion of 75 weight percent vinylidene chloride, 20 weight percent vinyl chloride, 3 weight percent ethyl acrylate and 2 weight percent methyl methacrylate. Each coated sample was then allowed to dry at room temperature and subsequently individually inserted into the center of a "dog-bone" mold used to measure tensile strength of mortars by the procedure described by the ASTM test C–790–59. Each half of the mold was then filled with a mortar having the following composition.

Ingredients: Parts by weight
Portland cement (Type III) _____ 100
Sand (No. 18 silica, 177 micron size) _____ 300
Water _____ 60

Each sample was then cured at room temperature for a period of 14 days.

By way of comparison, a series of samples were prepared and tested as described herein where precoating of the metallic surfaces with a polymeric latex was omitted. These samples are herein identified as Comparative Samples No. 1.

In another series of comparative experiments the individual metallic pieces were precoated with an aqueous emulsion of 48 weight percent of a solid copolymer of about 66 percent styrene and 34 percent butadiene. These samples are hereinafter identified as Comparative Samples No. 2.

In yet another series of comparative experiments, the individual metallic pieces were precoated with an aqueous emulsion of 48 weight percent of a solid acrylic copolymer of about 66% ethyl acrylate and 32% methyl methacrylate, 1% acrylic acid and 1% methacrylic acid. These samples are hereinafter identified as Comparative Samples No. 3.

In still another series of comparative experiments, the individual metallic pieces were separately precoated with a polyvinyl acetate latex available commercially as "Flexbond 811." These samples are hereinafter identified as Comparative Samples No. 4.

The following Table I identifies the metals employed and the resultant strength in p.s.i. required to separate the cured mortar compositions from the metal surface.

Example 2

In each of a series of experiments individual brick wall structures about 16 inches in length and about 16 inches high were prepared by first individually immersing the bricks to be used for a period of about 10 seconds, in an aqueous emulsion composed of about 50 percent by weight of a solid interpolymer of about 75 weight percent vinylidene chloride, 20 weight percent of vinyl chloride, about 3 weight percent of ethly acrylate, and about 2 weight percent of methyl methacrylate. The coated bricks were then dried overnight at room temperature and subsequently formed into the designated wall structure using one of the following conventionally employed mortar compositions.

Mortar Composition No. 1

Ingredient: Parts by weight
Portland cement _____ 100
Sand _____ 300
Water _____ 60

Mortar Composition No. 2

Ingredient: Parts by weight
Portland cement _____ 100
Lime _____ 50
Sand _____ 450
Water _____ 100

Each of the so-formed wall structures were then aged 14 days at normal room temperature and then subjected to a flexural stress to determine the strength of the mortar.

The following Table II illustrates the type of brick employed for each wall structure, the water absorption of each of the several types of bricks used, both before and after coating with the polymer latex (as per ASTM test C–67), the polymeric coating weight applied, the type of mortar used, and the strength characteristics of the individual wall structures. For purposes of comparison, wall structures were similarly prepared using bricks which were not coated with the designated polymer latex.

TABLE II

| Sample Designation | Type of Brick | Weight of Polymeric Coating (gms. polymer per brick) | Water Absorption Rate | | Mortar Type, Number | P.s.i. to Rupture | Location of Rupture |
|---|---|---|---|---|---|---|---|
| | | | Uncoated Brick | Coated Brick | | | |
| 1 | Ristocrat Buff | | 7.0 | | 1 | 59 | Bond. |
| 2 | do | 7.2 | 7.0 | 0.6 | 1 | 71 | Mortar. |
| 3 | do | | 7.0 | | 2 | 165 | Bond. |
| 4 | do | 7.2 | 7.0 | 0.6 | 2 | 203 | Mortar. |
| 5 | Streator Buff | | 15 | | 1 | 32 | Bond. |
| 6 | do | 12.2 | 15 | 1.5 | 1 | 137 | Mortar. |
| 7 | do | | 15 | | 2 | 66 | Bond. |
| 8 | do | 12.2 | 15 | 1.5 | 2 | 191 | Mortar. |
| 9 | Beldon Red Rugg | | 28 | | 1 | 40 | Bond and Mortar. |
| 10 | do | 18.3 | 28 | 1.3 | 1 | 74 | Mortar. |
| 11 | do | | 28 | | 2 | 20 | Bond. |
| 12 | do | 18.3 | 28 | 1.3 | 2 | 188 | Mortar. |

NOTE.—Ristocrat—Ristocrat Clay Products Co.; Streator—Streator Co.; Beldon—Beldon Corp.

The data of Table II clearly illustrate that the flexural strength of a brick wall can be significantly improved by precoating the bricks with the designated polymeric latex. This result is apparently accomplished by shifting the point of failure from the bond joint to the tensile strength characteristics of the mortar employed.

Similar good results as specifically set forth herein are

TABLE I

| Sample Number | Latex Coating Composition | Galvanized Iron | Black Iron | Steel | Stainless Steel | Monel | Copper | Aluminum |
|---|---|---|---|---|---|---|---|---|
| | | (p.s.i. to separate mortar from metal) | | | | | | |
| For Comparison: | | | | | | | | |
| 1 | None | 19 | >10 | <10 | <10 | 0 | 0 | 0 |
| 2 | 60/40 Styrene/Butadiene | <10 | <10 | 43 | <10 | 0 | 0 | 0 |
| 3 | Acrylic copolymer | 71 | 31 | 33 | 62 | 0 | <10 | |
| 4 | Polyvinyl acetate | 66 | 55 | 50 | 102 | <10 | 64 | 0 |
| The Invention: | | | | | | | | |
| 5 | 75/20/3/2 Vinylidene chloride/Vinyl chloride/Ethyl acrylate/methyl methacrylate. | 183 | 127 | 91 | 107 | 70 | 88 | 53 | obtained utilizing any of the vinylidene chloride interpolymeric latexes described herein the manner prescribed by the process comprising the present invention.

What is claimed is:

1. A process for promoting the adhesion of cementitious material to brick or metallic surfaces which comprises the sequential steps of (1) applying to said surfaces an essentially continuous coating of a thermoplastic vinylidene chloride interpolymeric latex consisting essentially of from about 35 to about 90 percent by weight of vinylidene chloride and from about 65 to about 10 percent by weight of a dissimilar interpolymerizable comonomer, as based on a total interpolymer latex solids content of 100 percent by weight, (2) allowing said coating to dry to a film, (3) applying an aqueous hydraulic cementitious material to the coated surfaces, and (4) allowing said cementitious material to harden.

2. The process of claim 1 wherein said dissimilar interpolymerizable comonomer is selected from the group having the formula

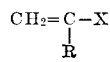

wherein R is selected from the group consisting of hydrogen and the methyl group and X is selected from the group consisting of —CN, halogens of atomic numbers 9 to 35, and ester-forming groups —COOY, wherein Y is selected from the group consisting of a primary alkyl group and a secondary alkyl group, and wherein each of said alkyl groups contain from 1 to 18 carbon atoms.

3. The process of claim 2 wherein said cementitious material is portland cement mortar.

4. The process of claim 3 wherein said vinylidene interpolymer latex is an interpolymer of about 75 percent by weight vinylidene chloride, about 20 percent by weight vinyl chloride, about 3 percent by weight ethyl acrylate and about 2 percent by weight methyl methacrylate.

References Cited

UNITED STATES PATENTS

| 2,760,885 | 8/1956 | Larsen | 117—70 |
| 2,976,173 | 3/1961 | Czerwin et al. | 117—70 |
| 2,992,131 | 7/1961 | Bricknell et al. | |
| 3,286,904 | 11/1966 | Vieth et al. | |

WILLIAM D. MARTIN, *Primary Examiner.*

R. HUSACK, *Assistant Examiner.*